United States Patent
Schur et al.

(10) Patent No.: US 9,304,892 B2
(45) Date of Patent: Apr. 5, 2016

(54) DETERMINING BEHAVIOR MODELS

(71) Applicants: Matthias Schur, Darmstadt (DE); Andreas Roth, Walzbachtal (DE)

(72) Inventors: Matthias Schur, Darmstadt (DE); Andreas Roth, Walzbachtal (DE)

(73) Assignee: SAP SE, Walldorf (DE)

( * ) Notice: Subject to any disclaimer, the term of this patent is extended or adjusted under 35 U.S.C. 154(b) by 403 days.

(21) Appl. No.: 13/908,244

(22) Filed: Jun. 3, 2013

(65) Prior Publication Data

US 2014/0359371 A1    Dec. 4, 2014

(51) Int. Cl.
*G06F 11/36*    (2006.01)

(52) U.S. Cl.
CPC .................... *G06F 11/3684* (2013.01)

(58) Field of Classification Search
CPC ............ G06F 11/3684; G06F 11/3688; G06F 11/263; G06F 11/3672
See application file for complete search history.

(56) References Cited

U.S. PATENT DOCUMENTS

| | | | |
|---|---|---|---|
| 6,577,982 B1 | 6/2003 | Erb | |
| 7,480,602 B2 | 1/2009 | Duffie et al. | |
| 7,725,851 B2 | 5/2010 | Eisner et al. | |
| 7,813,911 B2 | 10/2010 | Triou et al. | |
| 7,840,944 B2 | 11/2010 | Brunswig et al. | |
| 7,865,780 B2 | 1/2011 | Dipper et al. | |
| 8,166,347 B2 | 4/2012 | Kirtkow et al. | |
| 8,527,954 B2 | 9/2013 | Benameur et al. | |
| 8,667,467 B2 | 3/2014 | Dubey et al. | |
| 2006/0075305 A1 | 4/2006 | Robinson et al. | |
| 2007/0050758 A1* | 3/2007 | Arevalo | G06F 17/5027 717/135 |
| 2008/0263503 A1 | 10/2008 | Polly et al. | |
| 2009/0307664 A1 | 12/2009 | Huuck et al. | |
| 2013/0239092 A1 | 9/2013 | Wieczorek et al. | |
| 2013/0318402 A1 | 11/2013 | Rapp et al. | |
| 2013/0332442 A1 | 12/2013 | Liu et al. | |
| 2013/0338995 A1* | 12/2013 | Elkins | G06F 17/28 704/2 |
| 2013/0339930 A1* | 12/2013 | Xu | G06F 11/3684 717/125 |
| 2014/0130014 A1* | 5/2014 | Jensen | G06F 11/3684 717/124 |

OTHER PUBLICATIONS

J. Cortadella, et al., "Petrify: a tool for manipulating concurrent specifications and synthesis of asynchronous controllers," IEICE Transactions on Information and Systems, vol. 80, No. 3 (1997), pp. 315-325.

A. Mesbah, et al., "Crawling Ajax-Based Web Applications through Dynamic Analysis of User Interface State Changes," ACM Transactions on the Web, vol. 6, No. 1 (2012), 30 pages.

(Continued)

*Primary Examiner* — Jigar Patel (57) ABSTRACT

Methods, systems, and computer-readable storage media determining a behavior model of a computing system under test. In some implementations, actions include executing, using a user interface of a computing SUT, an initial test script on the SUT; recording, after executing the initial test script, a state of the SUT in the behavior model by observing one or more events that can be triggered using the user interface of the SUT; and iteratively refining the behavior model until an end condition is reached by generating one or more new test scripts, executing the new test scripts on the SUT to test unobserved behavior, and recording one or more new states reached by executing the new test scripts on the SUT in the behavior model.

17 Claims, 4 Drawing Sheets

(56) References Cited

OTHER PUBLICATIONS

A. Mesbah, et al., "Invariant-Based Automatic Testing of Modern Web Applications," IEEE Transactions on Software Engineering, vol. 38, No. 1 (2012), pp. 35-53.

M. Schur, et al., "Mining Behavior Models from Enterprise Web Applications," ESEC/FSE 2013, Proceedings of the 2013 9th Joint Meeting on Foundations of Software Engineering, Aug. 2013, pp. 422-432.

* cited by examiner

DETERMINING BEHAVIOR MODELS

BACKGROUND

System testing is an important part of quality assurance in software engineering. System tests are typically end-to-end tests, written by test engineers based on scenarios derived from the requirements and use cases of the system under test (SUT). From these scenarios, manual test cases can be created that are performed by human testers to ensure the functional correctness of the SUT.

Test automation aims to automate these manual test cases, so that the tests can be performed repeatedly and in a highly reliable manner on different versions of the SUT, e.g., regression testing. Creating automated system tests can be challenging, e.g., because the test engineers writing system tests have not developed the functionality and need to learn the SUT, and because automating test cases is time consuming and changes in the SUT can often require corresponding changes to some automated tests.

Model based testing (MBT) aims to increase the level of automation in test design by introducing formal behavior models that are used to algorithmically derive test cases. Using MBT, the number of test cases can be more easily adjusted based on an available time frame and targeted coverage goals. Creating and maintaining formal behavior models that are suitable for MBT can require great knowledge of the SUT and the modeling language used for the behavior model, which can prevent the adoption of MBT in industrial software engineering.

SUMMARY

Implementations of the present disclosure include computer-implemented methods for determining a behavior model of a computing system under test. In some implementations, actions include executing, using a user interface of the SUT, an initial test script on the SUT; recording, after executing the initial test script, a state of the SUT in the behavior model by observing one or more events that can be triggered using the user interface of the SUT; and iteratively refining the behavior model until an end condition is reached by generating one or more new test scripts, executing the new test scripts on the SUT to test unobserved behavior, and recording one or more new states reached by executing the new test scripts on the SUT in the behavior model.

In some implementations, the system under test is an enterprise web application, and executing a test script comprises automating a web browser.

In some implementations, the actions further include receiving a URL of the enterprise web application; receiving login credentials for a plurality users of the web application; receiving a scope definition for testing the web application, the scope definition specifying the initial test script; and automating a respective web browser for each user and directing each web browser to the URL of the web application to supply the login credentials of the respective user.

In some implementations, the scope definition specifies a reset script for resetting the enterprise web application to a reset state.

In some implementations, the scope definition specifies an initial user script for each user, and wherein automating a respective web browser for each user comprises executing the initial user script for each user.

In some implementations, iteratively refining the behavior model comprises determining whether a new state corresponds to an existing state in the behavior model, and if not, generating at least one new test script if the new state comprises at least one interactive element in the user interface, and if so, not generating any new test scripts for the new state.

In some implementations, determining whether a new state corresponds to an existing state comprises: determining a plurality of potential events that a user can trigger in the new state; and comparing the potential events for the new state to each recorded state in the behavior model until a corresponding state is found or all of the recorded states have been compared.

In some implementations, iteratively refining the behavior model comprises determining whether a new state corresponds to a navigational event or a functional event, and if the new event corresponds to a functional event, recording the new state in the behavior model, and if the new event corresponds to a navigational event, not recording the new state in the behavior model.

In some implementations, the SUT is configured to provide a plurality of functions via a plurality of different views, and determining whether the new state corresponds to a navigational event or a functional event comprises determining whether the new state corresponds to an event that triggers a different view in the user interface of the SUT.

In some implementations, the actions further comprise identifying candidate functional events by extracting, from the user interface of the SUT, a document object model (DOM) for each of the plurality of different views and identifying interactive Hypertext Markup Language (HTML) elements as candidate functional events.

In some implementations, the actions further comprise storing the behavior model as a directed graph comprising a node for each recorded state in the behavior model and a plurality of edges each representing an event that can be triggered by the user interface of the SUT.

In some implementations, an event that can be triggered by the user interface of the SUT is an interactive Hypertext Markup Language (HTML) element.

In some implementations, generating a new test script comprises: receiving a document object model (DOM) for the user interface of the SUT; for each event of a plurality of potential events that a user can trigger in the DOM, generating a user interface script that, when executed, triggers that event.

In some implementations, the actions further comprise filtering the potential events before generating the user interface scripts.

In some implementations, filtering the potential events comprises removing deactivated elements and invisible elements from the DOM.

In some implementations, the actions further comprise performing regression testing on the SUT using the behavior model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a modeling system for determining a behavior model of a computing system under test (SUT). In some examples, the behavior model can be used for program comprehension and deriving executable test scripts using model based testing (MBT) tools. The modeling system observes the behavior of the SUT through the user interface of the SUT, and iteratively generates and executes test scripts to explore unobserved behavior. The modeling system determines the behavior model by recording states of the SUT, e.g., where a state is a set of events that can be triggered using the user interface of the SUT. The resulting behavior model can be used for testing the SUT, e.g., regression testing the SUT, or for program comprehension, or for other purposes.

Figure 1:
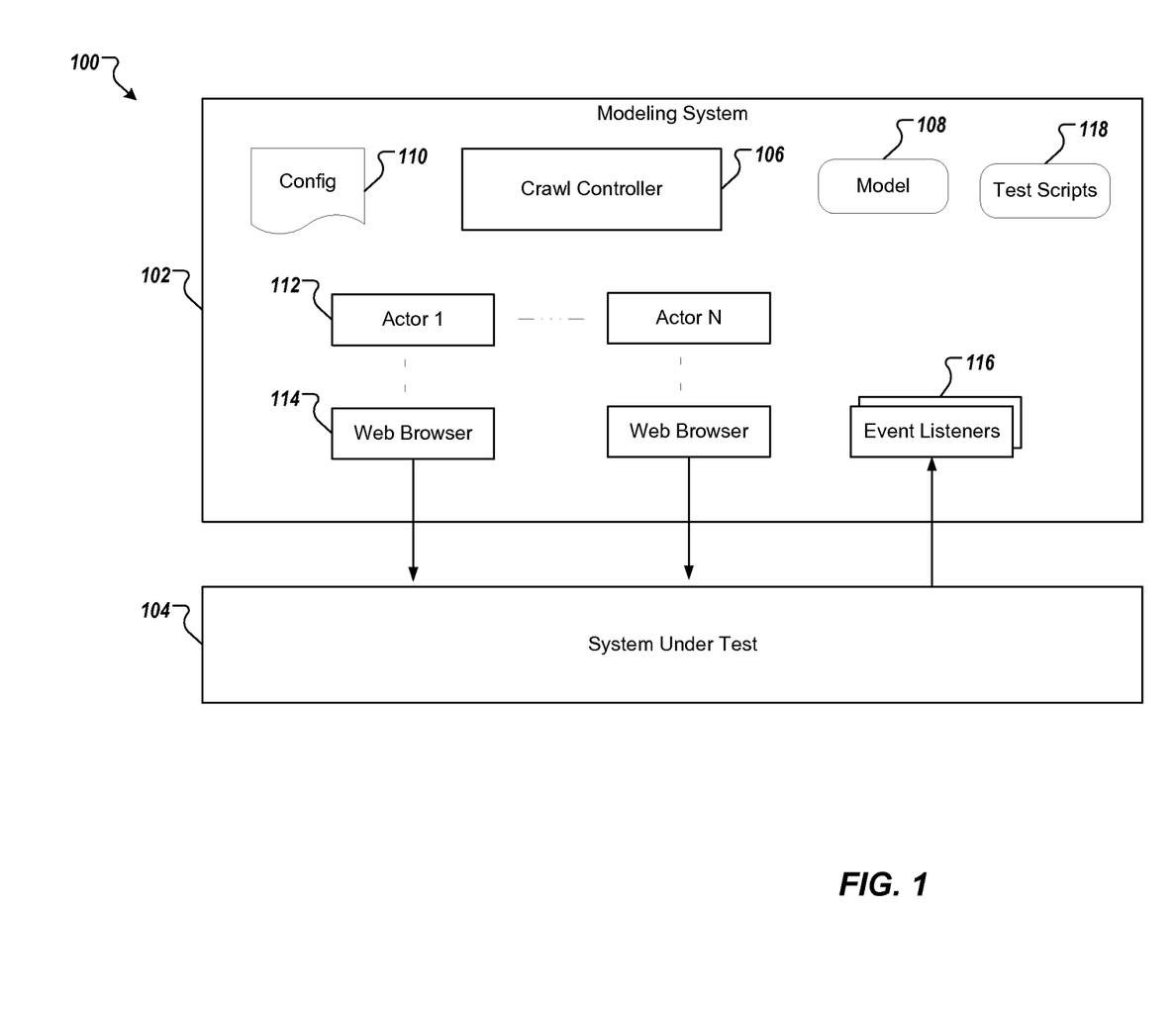
FIG. 1 depicts an example high-level architecture in accordance with implementations of the present disclosure.

FIG. 1 depicts an example architecture 100 in accordance with implementations of the present disclosure. The example architecture 100 includes a modeling system 102 and a SUT 104. In some implementations, the SUT 104 is an enterprise web application executing on a server of one or more computers remote from the modeling system. In some implementations, the modeling system 102 and the SUT 104 are both applications executing on a system of one or more computers. For example, the SUT 104 can execute within a virtual machine executing on the system of one or more computers. Implementations of the present disclosure are applicable to any appropriate application or computing environment and are not limited to the examples and implementations discussed herein.

The modeling system 102 includes a crawl controller 106 configured to determine a behavior model 108 for the SUT 104. The crawl controller 106 executes, using a user interface of the SUT 104 and one of the actors 112, an initial test script on the SUT 104. The crawl controller 106 records, after executing the initial test script, a state of the SUT 104 in the behavior model 108 by observing one or more events that can be triggered by the user interface of the SUT 104. The crawl controller can navigate through different user interface views of the SUT 104 with each actor 112 and extract a set of elements from the user interface view of the SUT 104.

The crawl controller 106 then iteratively refines the behavior model 108 until an end condition is reached. While iteratively refining the behavior model, the crawl controller 106 generates new test scripts to test unobserved behavior, executes the new test scripts on the SUT, and records new states reached by executing the new test scripts of the SUT 104 in the behavior model 108. The test scripts can be stored in a repository 118 with the model 108.

In some examples, the SUT 104 is an enterprise web application. The crawl controller 106 executes the test scripts by emulating one or more actors 112 using one or more web browsers 114 that communicate with the enterprise web application, e.g., over the Internet or another data communications network. The web browsers can be automated, for example, using Selenium.

Configuration information 110, which can be provided by, e.g., a software developer or test engineer, specifies a scope definition for the modeling system. The scope definition specifies the initial test script and information for emulating the actors, e.g., login credentials for users of the application and a series of steps for each user to take in interacting with the application. The configuration information can also specify a series or set of parts of the user interface (views) which the crawl controller can use to extract state information. The configuration information can include a uniform resource locator (URL) for the enterprise web application or a URL for each actor. The configuration information can also include a reset script for resetting the enterprise web application to a reset state, e.g., the initial state (e.g., state "0" in FIG. 2A).

In some examples, the modeling system 102 includes one or more event listeners 116 to register to actor and model events. These events can include, e.g., an event when an actor clicks on an element, an event when an actor navigates to a URL, and an event when an edge or state is added to the model. Event listeners can be used to implement test oracles searching for certain keywords in text such as "error" or checking if certain user interface elements are visible such as an error pop-up, e.g., after an actor clicked an element and then performed some actions, e.g., taking a screenshot and logging the event. Event listeners can also be used to generate and insert input data for input forms.

After an actor trigger an event in the SUT 104, the crawl controller 106 determines whether the resulting new state of the SUT 104 corresponds to an existing state in the behavior model 108. In some implementations, the crawl controller 106 determines whether the new state corresponds to an existing state by comparing potential events that a user can trigger in the new state using the user interface with each recorded state in the behavior model 108 until a corresponding state is found or all of the recorded states have been compared. The crawl controller can also analyze text, e.g., "status: shipped."

If the new state does not correspond to an existing state, the crawl controller 106 adds the new state to the behavior model 108 and generates new test scripts for potential events that a user can trigger in the new state. The crawl controller 106 can then iteratively explore the SUT 104 for unobserved behavior by executing the new test scripts. In some examples generating a new test script includes receiving a document object model (DOM) for the user interface of the SUT 104 and, for each potential event that a user can trigger in the DOM, generating a user interface script that, when executed, triggers the event. The potential events can be filtered, e.g., by removing deactivated elements and invisible elements from the DOM. The user can also filter/remove other elements by changing the default configuration, which can reduce runtime.

If the new state does correspond to an existing state, then the crawl system does not add the new state to the behavior model 108. The crawl controller 106 can continue to iteratively explore the SUT 104 for unobserved behavior if there are new test scripts, previously generated, that have not yet been executed, or the crawl controller 106 can reach an end condition indicating that the behavior model 108 is complete. The end condition can be, e.g., a configured timeout, or a number of states recorded in the model.

In some implementations, the crawl controller 106 determines whether an event triggered through the user interface of the SUT 104 is a navigational event or a functional event. If the event is a navigational event, then the crawl controller 106 does not add the resulting new state to the behavior model 108. If the event is a functional event, then the crawl controller 106 does add the new state to the behavior model 108. This can be useful, for example, to avoid capturing volatile specifics of the user interface that are likely to change during the development of the SUT 104.

In general, a navigational event does not lead to a new state. A navigational event results in a reflexive transition, which can be included (but may not be displayed) in the behavior model. If the crawl controller 106 detects a navigational event, it checks the configuration 110 (or, e.g., a configuration of a respective actor) for a maximum crawl/click depth. If the max click depth is not reached, the crawl controller 106 checks if the navigational event leads to a new view with potential functional actions, by observing the active interactive user interface elements before and after executing the navigational event. If the navigational event activates new interactive user interface elements, a test script for each element is generated, that executes the navigational event followed by clicking the interactive user interface element. This way navigational actions may not be included in the behavior model, but in the generated test scripts, which are easier to change in case of user interface changes. This can make the model more stable to user interface changes.

In some examples, the SUT 104 is configured to provide functions via different views, e.g., windows in a graphical user interface (GUI) or different web pages of a web application, and determining whether a new state corresponds to a navigational event or a functional event includes determining whether the new state corresponds to an event that triggers a different view in the user interface of the SUT 104. Events that trigger different views can be classified as navigational events. In some examples, candidate functional events are identified by extracting, from the user interface of the SUT, a DOM for each of the different views presented and identifying interactive elements, e.g., interactive Hypertext Markup Language (HTML) elements, as candidates for user interface elements that can cause functional events. A different DOM can be extracted for each actor defined in the configuration.

In some implementations, the modeling system 102 stores the behavior model 108 as a directed graph. The directed graph can include a node for each recorded state in the behavior model 108 and edges between nodes. Each edge represents an event that can be triggered using the user interface of the SUT to transition from the states represented by the nodes connected to the edge. In some examples, the stored behavior model 108 is used for testing the SUT 104, e.g., by performing regression testing. In some examples, edges can represent the execution of a complex event by one of the actors 112 on the SUT 104. Each edge can be linked to an actor 112 and a generated test script including one or more navigational events followed by a functional event.

Figure 2A:
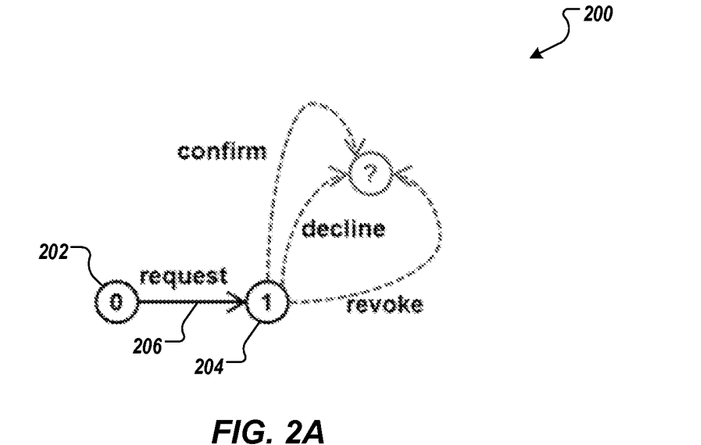
FIGS. 2A and -2B depict example behavior models represented as directed graphs.
Figure 2B:
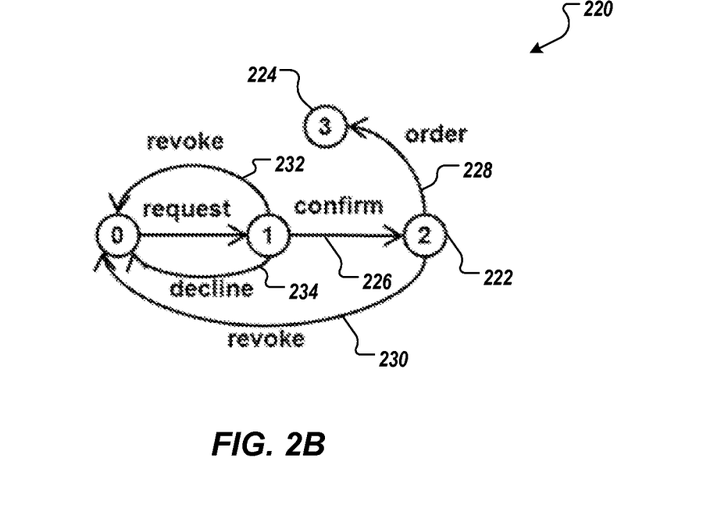

FIGS. 2A and 2B depict example behavior models represented as directed graphs. A modeling system, e.g., the modeling system 102 of FIG. 1, can generate the behavior models of a system under test (SUT), e.g. the SUT 104 of FIG. 1.

FIG. 2A depicts an initial behavior model 200 with two nodes 202 and 204 representing two different states of a system under test (SUT), labeled "0" and "1." The modeling system begins by observing that the SUT is in state "0" and, by executing an initial test script, triggers a "request" event using the user interface of the SUT to cause the SUT to move to state "1." An edge 206 between the nodes 202 and 204 indicates that, from state "0," triggering the "request" event (e.g., using an actor) causes the SUT to move to state "1."

The modeling system, observing the state of the SUT after the "request" event, determines that there are three potential events that a user can trigger using the user interface, a "confirm" event, a "decline" event, and a "revoke" event. The modeling system can refine the model by generating test scripts to observe the behavior of the system after triggering each of these events. The events may be executed by different actors, e.g., an employee (revoke) and a manager (confirm, decline).

FIG. 2B depicts a refined behavior model 220 with two additional nodes 222 and 224 representing two new states of the SUT, labeled "2" and "3." The modeling system created this refined model from the initial model by executing test scripts for the potential events of the initial model 200 and observing the effects of executing the events.

One edge 226 indicates that the SUT moved from state "1" to state "2" after triggering the "confirm" event. Another edge 228 indicates that the SUT moved from state "2" to state "3" after triggering an "order" event available in state "2." Another edge 230 indicates that the SUT moved from state "2" to existing state "0" after triggering a "revoke" event. Another edge 232 indicates that the SUT moved from state "1" to existing state "0" after triggering a "revoke" event. Another edge 234 indicates that the SUT moved from state "1" to existing state "0" after triggering a "decline" event.

In some implementations, the model is a labeled, directed graph, denoted by a tuple, e.g., $<A,N,V,v_0,E>$, where
(1) A is a set of actors representing users with different roles performing actions on the UI of the SUT
(2) N is a set of navigational actions for navigating to different views of the SUT's UI
(3) V is a set of vertices representing the states of the SUT. Each vertex $v \in V$ represents an abstraction over UI elements in $S \in P_{\geq 1}(A \times N)$, such as the set of interactive UI elements.
(4) $v_0 \in V$ represents the initial state of the SUT.
(5) E is a set of directed edges between vertices (states). Each edge $(v_1, v_2) \in E$ is labeled by a reference to a relation $(a \in A, s \in S)$, where s is a generated action sequence (test script) comprising an optional sequence of navigational actions $n \in N$ to reach a certain view on the SUT's UI, followed by a functional action that is active on that view. Two vertices $v_1$ and $v_2$ are connected by an edge $(v_1, v_2)$ iff executing s with actor a in state $v_1$ leads to state $v_2$.

Figure 3:
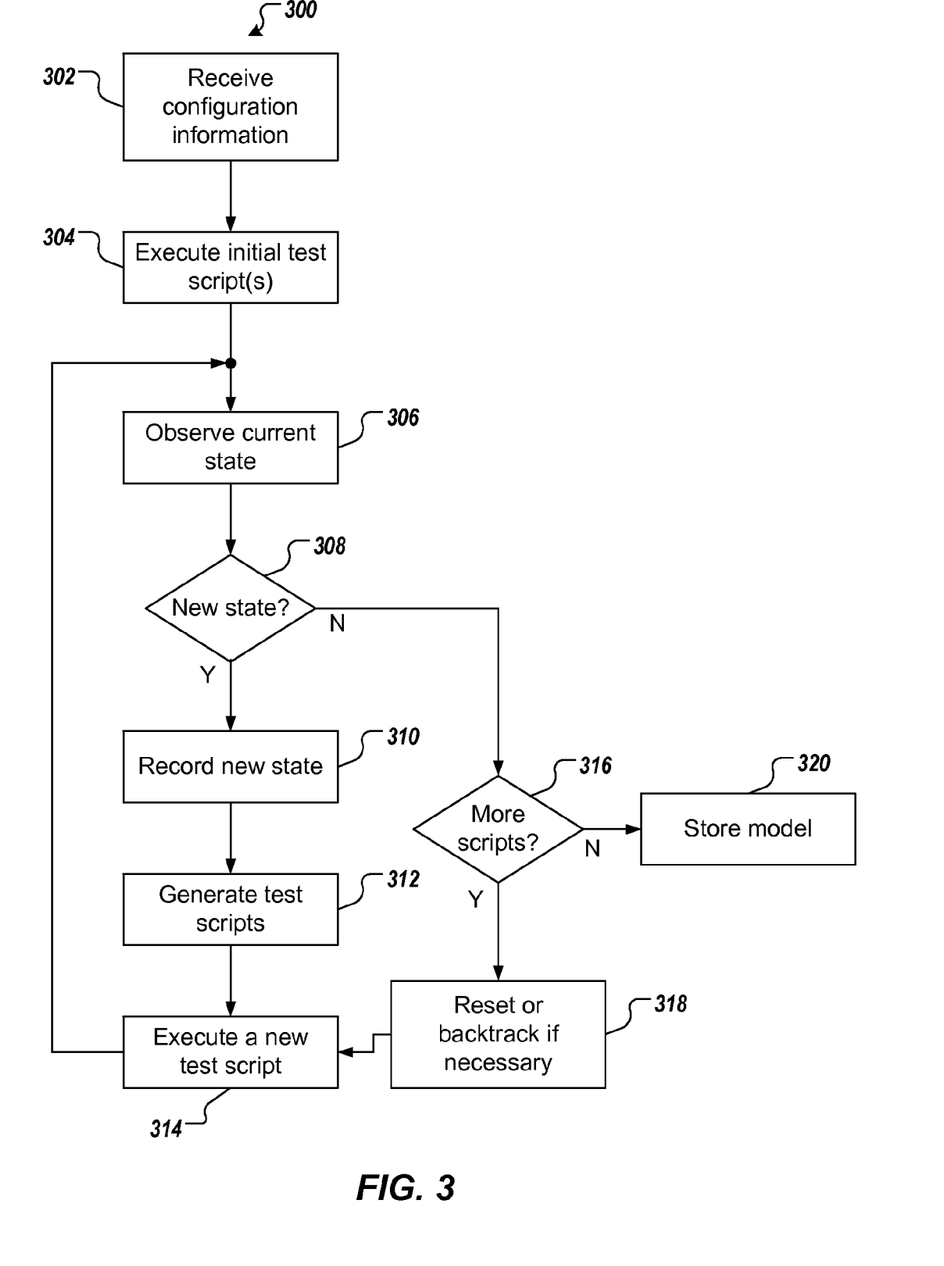
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. For example, the modeling system 102 of FIG. 1 can execute the process in determining a behavior model for a system under test (SUT), e.g., the SUT 104 of FIG. 1.

Configuration information is received (302). In some examples, the configuration information is provided by a test engineer or a development engineer. The configuration information can include, e.g., a scope definition, one or more user identifiers and login credentials for the user identifiers, initial test scripts for each user identifier, and so on.

The initial test script or scripts are executed (304), and the current state of the SUT is observed (306). It is determined whether the current state is a new state or whether the current state corresponds to an existing state in the model (308). If the state is a new state, the new state is recorded (310), e.g., by adding a node and an edge to a directed graph. New test scripts are generated (312) based on potential events that can be triggered through the user interface of the SUT by an actor. One of the new test scripts is selected and executed (314), and then the current state is observed (return to 306).

If the current state corresponds to an existing state, it is determined whether there are more test scripts to execute (316), e.g., by searching the model for pending actions or events. If there are no more test scripts, the behavior model is stored (320), e.g., as a directed graph. The behavior model can be stored after each change, e.g., adding an edge or state. If there are more scripts, then the SUT is reset or backtracked as necessary to reach a state to start one of those scripts, and that script is executed (314).

The process 300 can be implemented in various ways, for example, using Java with Selenium for web browser automation. The following are example routines that can be used in implementing the process.

Algorithm 1, provided below, shows the initialization of the process for determining the behavior model. The process is parameterized with a state s0 in which crawling starts and an initial graph, which is iteratively built up over the set of states. First, the initial state s0 of the SUT is retrieved (Line 1). A state has a set of potential events which are triggered through the user interface of the SUT in that state; for the initial state s0 the set of potential events is set to the start event defined in the configuration (Line 2). Furthermore, we maintain a set of pending states Sp which are yet unobserved, and the set of pending states Sp is initialized with s0. An empty graph is created and s0 is set as initial state (lines 4-5). The crawling procedure is called with s0 and the graph (Line 6).

---
Algorithm 1: INIT
---
Data: set of actors A
Data: crawl config
Data: set of pending states $S_p$
Output: graph
1  $s_0 \leftarrow$ RETRIEVESTATE( );
2  $s_0$.pending $\leftarrow$ {config.startEvent};
3  $S_p \leftarrow \{s_0\}$;
4  graph $\leftarrow$ new PropertyGraph( );
5  graph.initialState $\leftarrow s_0$;
6  return CRAWL($s_0$, graph);
---

The state of the SUT is retrieved as shown in Algorithm 2, provided below. For each actor, the DOMs of the views defined in the actor configuration are retrieved (Line 5), removing deactivated and invisible HTML elements (Line 6). Interactive HTML elements are extracted from the altered DOM df and added to the state's multiset of events (Line 7). Two states are considered as equal if and only if the set of distinct elements in the multiset of events is equal. Text can also be used for state distinction, and the kind of text that can be used can be restricted to certain keywords, e.g., text that includes "status:". For each distinct event, a UI script is generated that triggers the event by navigating to the respective view with the respective actor and clicking the HTML element associated with the event (Line 10).

---
Algorithm 2: RETRIEVESTATE
---
Data: set of actors A
Output: current state s of the SUT
1   s $\leftarrow$ new State( );
2   for each actor $\epsilon$ A do
3      V $\leftarrow$ actor.config.views;
4      for each view $\epsilon$ V do
5         dom $\leftarrow$ actor.retrieveDom(view);
6         $d_f \leftarrow$ FILTER(dom);
7         s.events $\leftarrow$ s.events $\cup$ EVENTS(actor; view; $d_f$);
8      end
9   end
10  GENERATESCRIPTS(s.events);
11  return s;
---

Algorithm 3, provided below, shows the crawl procedure building up the behavior model. In each iteration, the current state of the SUT s0 is checked for pending events. If the set is not empty, an event is removed (Lines 2-3) and the UI script associated with the event is executed (Line 4). After the script execution, the current state s1 of the SUT is retrieved and the set of pending events, i.e., the events activated by the executed script, is computed as the relative complement of the multiset of events in s1 with respect to the events in s0 (Lines 5-6). The current state s1 is added to the set of pending events Sp and s1, as well as an edge from s0 to s1, labeled with the triggered event is added to the set of nodes and edges of the graph, respectively (Lines 7-10). Finally, the crawling procedure is called with s1 and the updated graph (Line 11). If the set of pending events is empty, s0 is removed from Sp (Line 13). In case there are still pending states in Sp, the backtracking procedure (Algorithm 4) is called to reach a pending state sp and the crawling procedure is called with sp (Lines 15-16). If the set of pending states is empty, the graph is returned (Line 18).

---
Algorithm 3: CRAWL
---
Data: set of actors A
Data: set of pending states $S_p$
Input: current state $s_0$ of the SUT
Input: initial graph
Output: enriched graph
1   if $s_0$. pending $\neq \emptyset$ then
2      event $\in s_0$. pending;
3      $s_0$.pending $\leftarrow s_0$.pending \ {event};
4      EXECUTESCRIPT(event);
5      $s_1 \leftarrow$ RETRIEVESTATE( );
6      $s_1$.pending $\leftarrow s_1$.events \ $s_0$.events;
7      $S_p \leftarrow S_p \cup \{s1\}$;
8      edge $\leftarrow$ new Edge($s_0$, event, $s_1$);
9      graph.nodes $\leftarrow$ graph.nodes $\cup \{s_1\}$;
10     graph.edges $\leftarrow$ graph.edges $\cup$ {edge};
11     graph $\leftarrow$ CRAWL($s_1$, graph);
12  else
13     $S_p \leftarrow S_p \setminus \{s_0\}$;
14     if $S_p \neq \emptyset$ then
15        $s_p \leftarrow$ BACKTRACK($s_0, S_p$);
16        graph $\leftarrow$ CRAWL($s_p$, graph);
17     else
18        return graph;
19     end
20  end
---

Algorithm 4, provided below, shows the backtracking procedure, which computes the shortest path from the current state s0 of the SUT to a pending state sp using Dijkstra's algorithm (Line 2) and executes the UI scripts to reach sp (Line 5). If the graph does not contain a path from s0 to a state in Sp, the SUT is set to the initial state by executing the script provided in the configuration (Line 10), s0 is set to the initial state, and the backtracking procedure is called again (Lines 11-12).

---
Algorithm 4: BACKTRACK
---
Data: graph
Data: crawl config
Input: current state $s_0$ of the SUT
Input: set of pending states $S_p$
Output: pending state $s_p$
1  for each p ∈ $S_p$ do
2      edges ← graph.shortestPath($s_0$, p);
3      if edges ≠ 0 then
4          for each e ∈ edges do
5              EXECUTESCRIPT(e.event);
6          end
7          return RETRIEVESTATE( );
8      end
9  end
10 EXECUTESCRIPT(config.initSut);
11 $s_0$ ← graph.initialState;
12 return BACKTRACK($s_0$, $S_p$);

---

Figure 4:
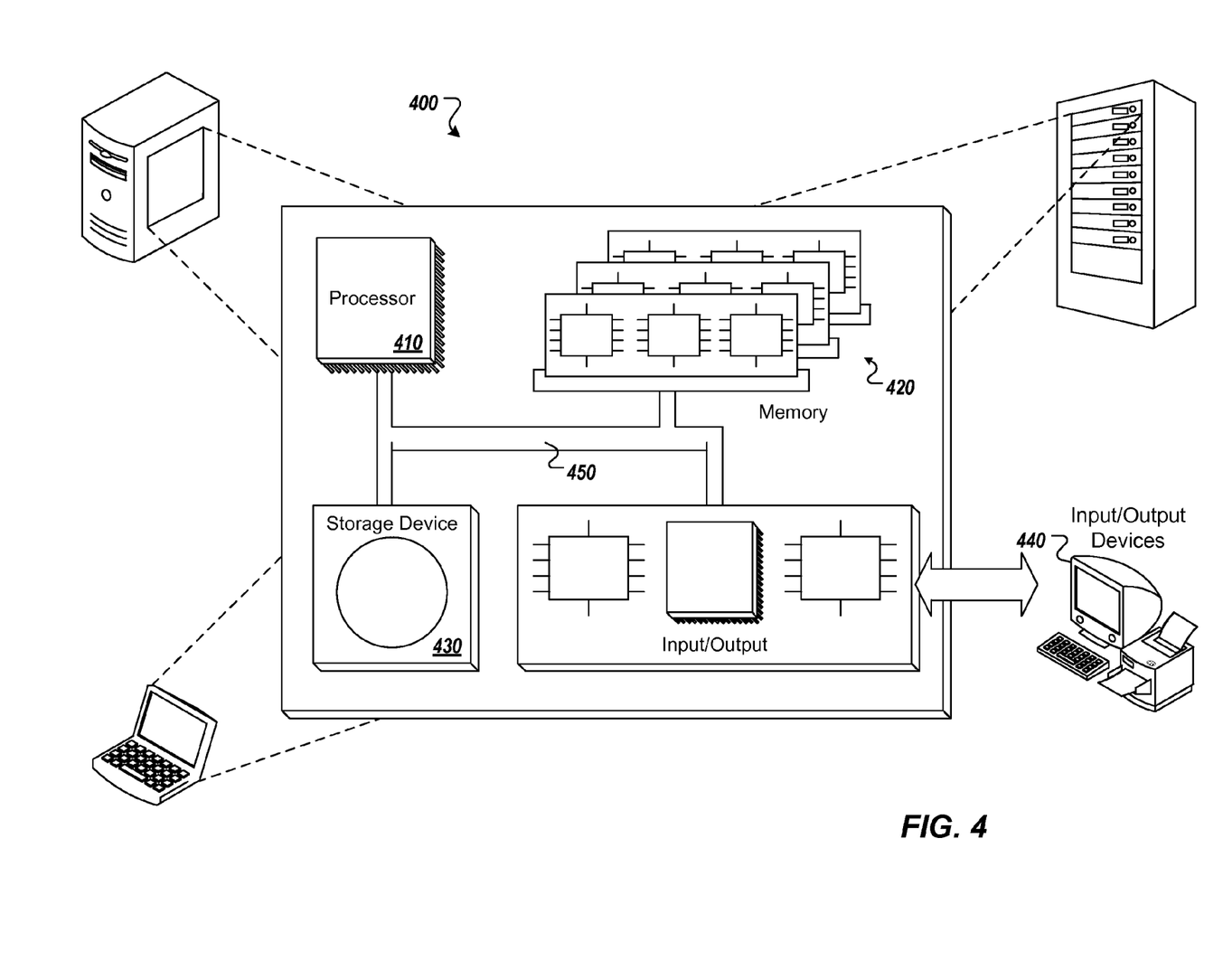
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 800. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining a behavior model of a computing system under test (SUT), the method being executed using one or more processors and comprising:
   executing, using a user interface of the SUT, an initial test script on the SUT;
   recording, after executing the initial test script, a state of the SUT in the behavior model by observing one or more events that can be triggered using the user interface of the SUT; and
   iteratively refining the behavior model until an end condition is reached by determining whether a new state corresponds to a navigational event or a functional event, and if the new event corresponds to a functional event, recording the new state in the behavior model, generating one or more new test scripts, executing the new test scripts on the SUT to test unobserved behavior, and recording one or more new states reached by executing the new test scripts on the SUT in the behavior model and if the new event corresponds to a navigational event, not recording the new state in the behavior model.

2. The method of claim 1, wherein the system under test is an enterprise web application, and wherein executing a test script comprises automating a web browser.

3. The method of claim 2, further comprising:
   receiving a URL of the enterprise web application;
   receiving login credentials for a plurality users of the web application;
   receiving a scope definition for testing the web application, the scope definition specifying the initial test script; and
   automating a respective web browser for each user and directing each web browser to the URL of the web application to supply the login credentials of the respective user.

4. The method of claim 3, wherein the scope definition specifies a reset script for resetting the enterprise web application to a reset state.

5. The method of claim 3, wherein the scope definition specifies an initial user script for each user, and wherein automating a respective web browser for each user comprises executing the initial user script for each user.

6. The method of claim 1, wherein iteratively refining the behavior model comprises determining whether a new state corresponds to an existing state in the behavior model, and if not, generating at least one new test script if the new state comprises at least one interactive element in the user interface, and if so, not generating any new test scripts for the new state.

7. The method of claim 6, wherein determining whether a new state corresponds to an existing state comprises:
   determining a plurality of potential events that a user can trigger in the new state; and
   comparing the potential events for the new state to each recorded state in the behavior model until a corresponding state is found or all of the recorded states have been compared.

8. The method of claim 1, wherein the SUT is configured to provide a plurality of functions via a plurality of different views, and wherein determining whether the new state corresponds to a navigational event or a functional event comprises determining whether the new state corresponds to an event that triggers a different view in the user interface of the SUT.

9. The method of claim 1, further comprising identifying candidate functional events by extracting, from the user interface of the SUT, a document object model (DOM) for each of the plurality of different views and identifying interactive Hypertext Markup Language (HTML) elements as candidate functional events.

10. The method of claim 1, further comprising storing the behavior model as a directed graph comprising a node for each recorded state in the behavior model and a plurality of edges each representing an event that can be triggered by the user interface of the SUT.

11. The method of claim 10, wherein an event that can be triggered by the user interface of the SUT is an interactive Hypertext Markup Language (HTML) element.

12. The method of claim 1, wherein generating a new test script comprises:
   receiving a document object model (DOM) for the user interface of the SUT;
   for each event of a plurality of potential events that a user can trigger in the DOM, generating a user interface script that, when executed, triggers that event.

13. The method of claim 12, further comprising filtering the potential events before generating the user interface scripts.

14. The method of claim 13, wherein filtering the potential events comprises removing deactivated elements and invisible elements from the DOM.

15. The method of claim 1, further comprising performing regression testing on the SUT using the behavior model.

16. A non-transitory computer-readable storage medium coupled to one or more processors and having instructions stored thereon which, when executed by the one or more processors, cause the one or more processors to perform operations for determining a behavior model of a computing system under test, the operations comprising:
   executing, using a user interface of the SUT, an initial test script on the SUT;
   recording, after executing the initial test script, a state of the SUT in the behavior model by observing one or more events that can be triggered using the user interface of the SUT; and
   iteratively refining the behavior model until an end condition is reached by determining whether a new state corresponds to a navigational event or a functional event, and if the new event corresponds to a functional event, recording the new state in the behavior model, generating one or more new test scripts, executing the new test scripts on the SUT to test unobserved behavior, and recording one or more new states reached by executing the new test scripts on the SUT in the behavior model and if the new event corresponds to a navigational event, not recording the new state in the behavior model.

17. A system, comprising:
   a computing device; and
   non-transitory a computer-readable storage device coupled to the computing device and having instructions stored thereon which, when executed by the computing device, cause the computing device to perform operations for determining a behavior model of a computing system under test, the operations comprising:
      executing, using a user interface of the SUT, an initial test script on the SUT;
      recording, after executing the initial test script, a state of the SUT in the behavior model by observing one or more events that can be triggered using the user interface of the SUT; and
      iteratively refining the behavior model until an end condition is reached by determining whether a new state corresponds to a navigational event or a functional event, and if the new event corresponds to a functional event, recording the new state in the behavior model, generating one or more new test scripts, executing the new test scripts on the SUT to test unobserved behavior, and recording one or more new states reached by executing the new test scripts on the SUT in the behavior model and if the new event corresponds to a navigational event, not recording the new state in the behavior model.

* * * * *